United States Patent

Burner

[11] Patent Number: 5,692,418
[45] Date of Patent: Dec. 2, 1997

[54] NUT RUNNER FOR REMOVING AND INSTALLING REACTOR PRESSURE VESSEL HEAD CLOSURE NUTS

[75] Inventor: James Edgar Burner, Downington, Pa.

[73] Assignee: General Electric Company, San Jose, Calif.

[21] Appl. No.: 449,440

[22] Filed: May 24, 1995

[51] Int. Cl.$^6$ ............................................ B25B 21/00
[52] U.S. Cl. .............................. 81/54; 81/55; 81/57.24
[58] Field of Search ............................ 81/54, 55, 56, 81/57, 57.11, 57.14, 57.24

[56] References Cited

U.S. PATENT DOCUMENTS

| | | | |
|---|---|---|---|
| 1,970,179 | 8/1934 | Miller | 81/57.14 |
| 2,390,620 | 12/1945 | Shapiro | 81/57.11 |
| 4,295,393 | 10/1981 | Adcock | 81/57.24 |
| 5,178,045 | 1/1993 | Frizot | 81/57.24 |

FOREIGN PATENT DOCUMENTS

| | | | |
|---|---|---|---|
| 169233 | 7/1988 | Japan | 81/54 |
| 180431 | 7/1988 | Japan | 81/54 |
| 401234657 | 9/1989 | Japan | 81/54 |
| 518070 | 2/1940 | United Kingdom | 81/55 |

*Primary Examiner*—D. S. Meislin
*Assistant Examiner*—Joni B. Danganan
*Attorney, Agent, or Firm*—James E. McGinness; Dennis M. Flaherty

[57] ABSTRACT

A nut runner tool is used to engage, turn, capture and lift the RPV head closure nuts from the RPV studs. The tool is also used to capture, lift and transport the nuts from the storage tray to the RPV head closure studs. The nut runner system enables a single operator to remove and install head closure nuts quickly and safely. The nut runner is powered by a remotely operated air driver. The reaction torque is transferred safely through the tool into the top of the closure stud. The air driver unthreads the nut, then a nut holding device is actuated, and the nut and tool are lifted from the top of the stud with a hoist attached to a trolley. The nut and tool are moved radially from the stud location to the storage position in the nut rack. When positioned over the storage location, the lowering of the nut into the rack is performed by the hoist, eliminating the need to manhandle the nuts into and out of the storage rack. After lowering the nut into the nut rack, the nut holding device is released and the nut runner is moved to the next location. The reverse of this process reinstalls the nuts.

19 Claims, 5 Drawing Sheets

NUT RUNNER FOR REMOVING AND INSTALLING REACTOR PRESSURE VESSEL HEAD CLOSURE NUTS

FIELD OF THE INVENTION

This invention relates to tools which are useful in the servicing and maintenance of a nuclear reactor having a reactor pressure vessel (RPV). In particular, the invention relates to tools which can be used to remove and install the RPV head closure nuts which hold the head closure on top of the vessel.

BACKGROUND OF THE INVENTION

During operation of a boiling water reactor, the RPV is closed by a head closure which is secured to the upper flange of the vessel by closure studs and associated stud nuts. In order to perform any maintenance, refueling, repair, inspection or other operation inside the RPV, the head closure must be removed to gain access to the vessel interior. All of the RPV head closure nuts must be removed to permit removal of the RPV head.

To accomplish RPV head closure nut, the utilities which operate boiling water reactors presently employ equipment and procedures that require extensive rigging and manual manipulation of the nut. Current methods for removal of the RPV head closure nuts use ropes, belts and hand-held air motor devices to run up the nut to the top of the stud. The nut is then manually lifted off the stud and placed into a storage container. This manual nut handling has inherent personnel risks. The current process is time consuming and tiring, requiring several operators in a high radiation field.

An alternative procedure is known using a commercially available nut runner tool that is positioned over the stud to capture and turn the nut off the stud. The nut is then held in the tool until placed into a storage container. Some field engineers who have employed this tool have noted the following drawbacks:

(1) The tool is very heavy (145 lbs.) and of such a length (7 feet long) that it is difficult to rig and handle when installed on the head lifting strongback and carousel due to the limited head room between the stud and carousel monorail. Special rigging is required to move the tool from the monorail position to the storage container in order to release or acquire a nut.

(2) The nut, when captured inside the tool from the storage container, must be placed onto the stud and released from the tool to allow manual engaging and initial turning of the nut on the stud. After thus manually starting the nut, the tool is reinstalled to run the nut the rest of the distance.

(3) The reaction torque from turning the nut must be countered by the operator. The operator must continuously restrain the tool during nut rotation.

SUMMARY OF THE INVENTION

The present invention is an RPV head closure nut runner which is free of the drawbacks which beset the foregoing commercially available tool. This nut runner allows remote powered removal/installation of the nut while requiring minimal rigging and handling by the operator. The difficulties inherent in the prior art are overcome by the nut runner of the present invention as follows:

(1) The nut runner of the present invention weighs only 65 lbs. and has an extended length of only 42 inches. The tool can easily be drifted from the monorail position to the storage container without special rigging.

(2) The nut is captured on the bottom of the tool in such a manner as to be fully accessible for starting on the stud either by motor drive or by hand. Starting can be visually verified without removal of the tool.

(3) The reaction torque is transferred safely through the tool into the top of the stud, which allows the operator to control the tool through a remote pendent. Thus there is no need to hold the tool during nut removal/installation.

The nut runner tool in accordance with the present invention can be suspended from the RPV head strongback carousel by means of the air chain hoist and trolley or attached to the overhead crane (or other existing equipment) and operated independently from the carousel. When used with the RPV head strongback carousel, the nut runner system comprises three components: the nut runner tool, a control pendent with actuating valve, and the air chain hoist with hand-powered trolley. The nut runner tool is used to engage, turn, capture and lift the RPV head closure nuts from the RPV studs. The tool is also used to capture, lift and transport the nuts from the storage tray to the RPV head closure studs. The nut runner system is designed to enable a single operator to remove and install head closure nuts quickly and safely.

The nut runner is powered by a remotely operated air driver. The reaction torque is transferred safely through the tool into the top of the closure stud. The air driver unthreads the nut, then the nut holding device is actuated, and the nut and tool are lifted from the top of the stud with the hoist attached to the trolley on the carousel. The nut and the tool are moved radially from the stud location to the storage position in the nut rack. When positioned over the storage location, the lowering of the nut into the rack is performed by the hoist, eliminating the need to manhandle the nuts into and out of the storage rack. After lowering the nut into the nut rack, the nut holding device is released and the nut runner is moved along the tensioner carousel track to the next location. The reverse of this process reinstalls the nuts.

The benefits of the nut runner system of the present invention are as follows: (1) only one remote operator is required to remove and install the head closure nuts; (2) the operator does not need to manually apply a reaction torque to the tool during nut detorquing; (3) manual manipulation of the nut by the operator is eliminated; and (4) the efficiency with which head closure nuts are removed is improved, resulting in outage critical path time savings and a reduction in the size of work crews.

DETAILED DESCRIPTION OF THE PREFERRED EMBODIMENT

Figure 2A:
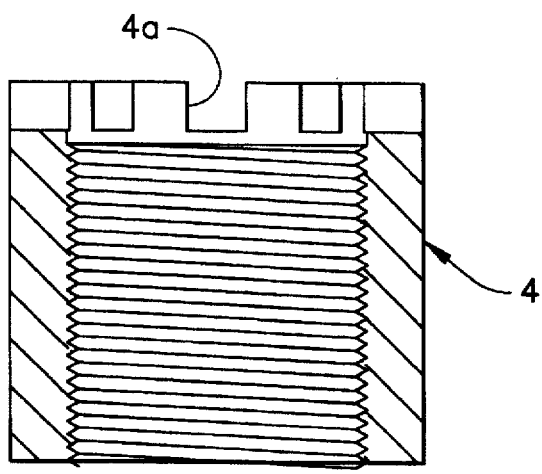
FIG. 2A is a sectional elevation view of a typical RPV head closure nut which threads onto the stud shown in FIG. 1A.
Figure 2B:
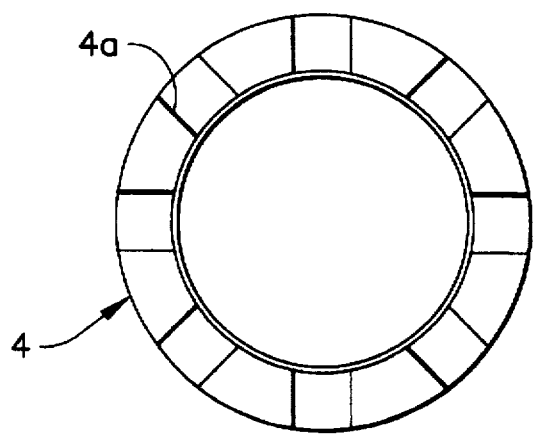
FIG. 2B is a plan view of the closure nut depicted in FIG. 2A.
Figure 3:
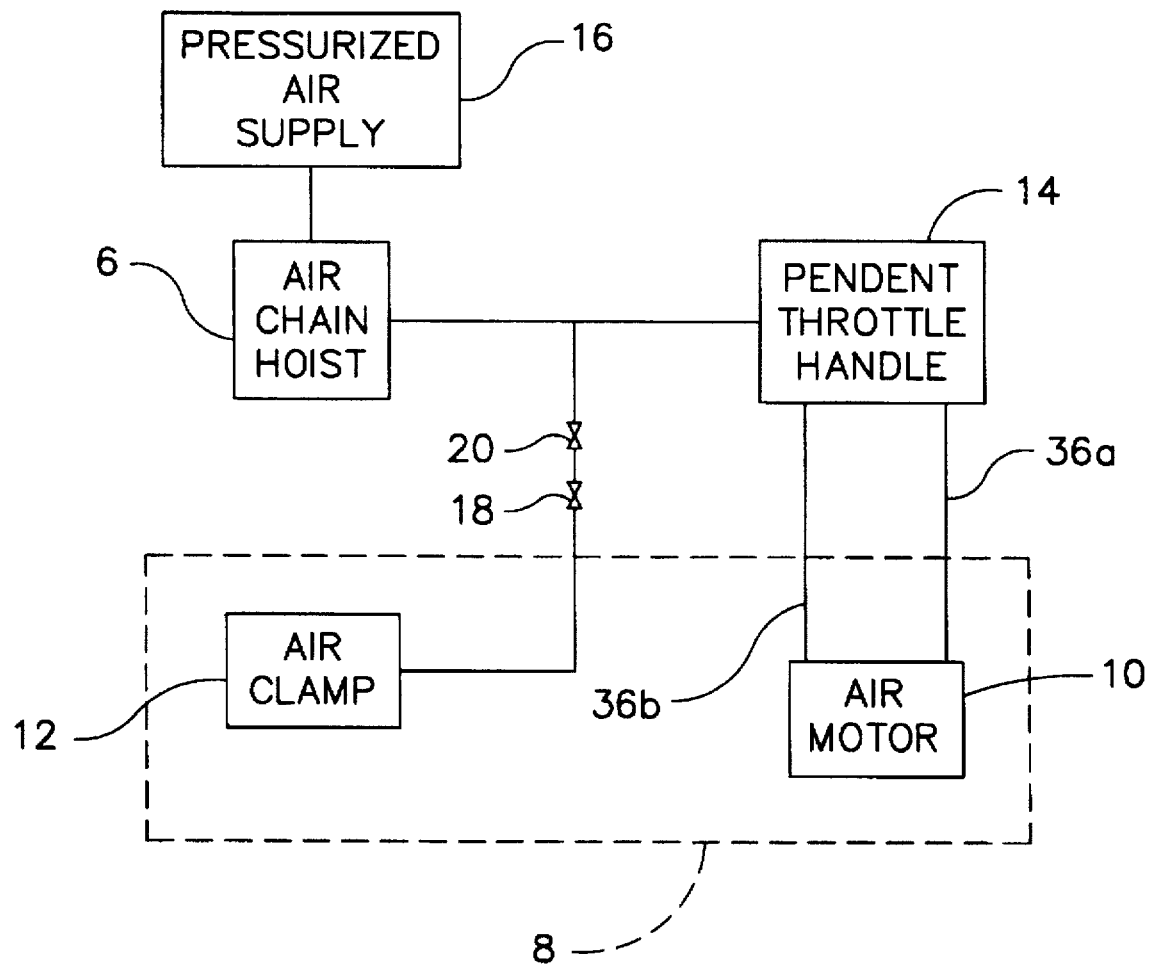
FIG. 3 is a block diagram showing the pneumatic connections of a nut runner system incorporating the nut runner tool of the present invention.

Referring to FIG. 3, the nut runner system in accordance with the present invention comprises an air chain hoist 6 suspended from a trolley (not shown), a nut runner tool 8 having a reversible vane-type air motor 10 for torquing and detorquing the closure nut 4 (see FIGS. 2A and 2B) and an air clamp 12 for capturing the closure nut when the closure nut is unthreaded from the closure stud 2. The supply of pressurized air to the air motor 10 is controlled by operation of a pendent throttle handle 14. The pendent throttle handle receives the pressurized air from source 16 via the air chain hoist 6.

When the closure nut is unthreaded from the closure stud, the air clamp 12 becomes located inside the closure nut. An actuating valve 18 on the control pendent is opened to supply air to the air clamp, which firmly captures it for lifting and removal. To prevent dropping the nut during lifting and transport, a check valve 20 is provided upstream of the actuating valve 18.

Figure 4:
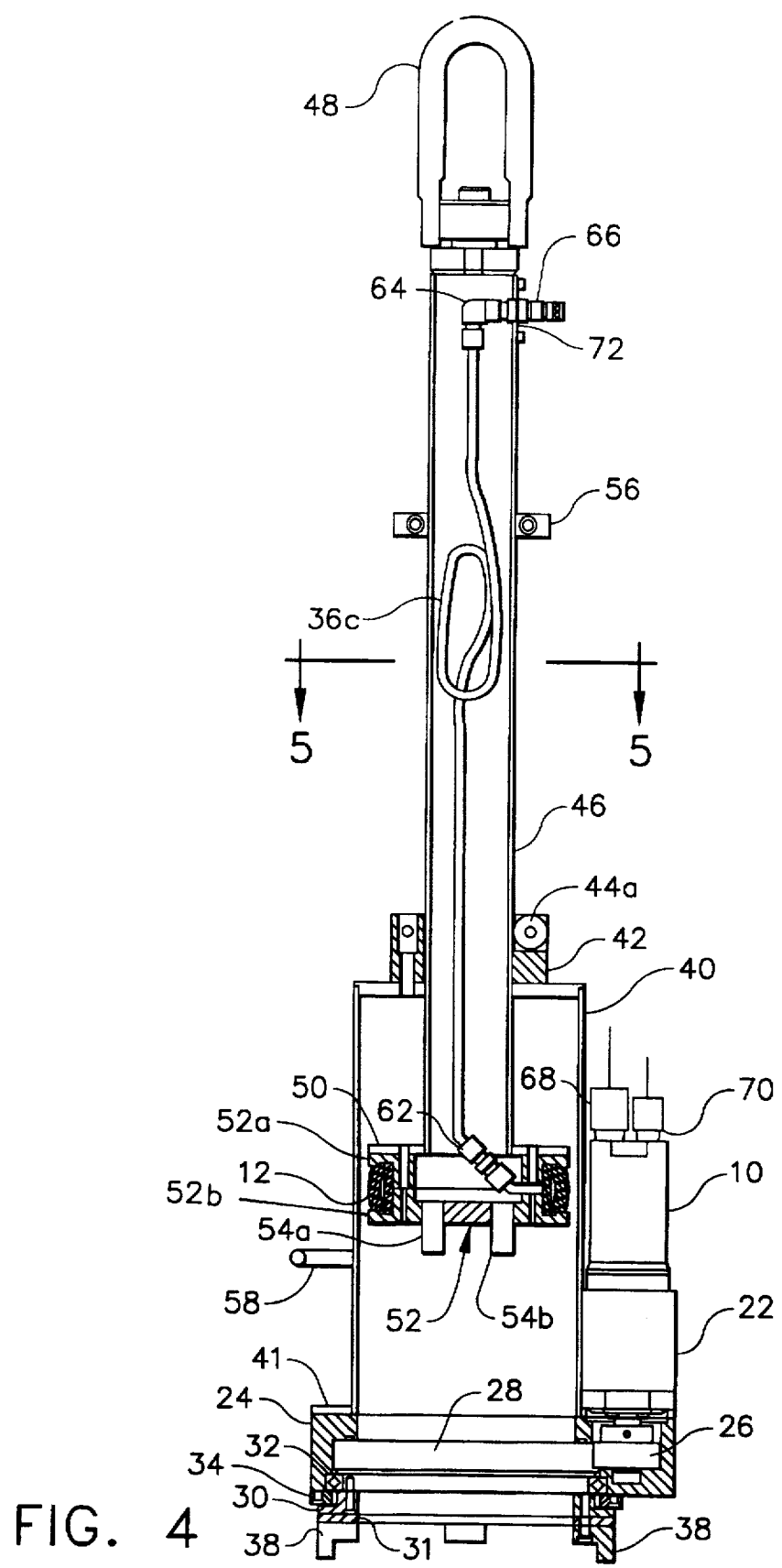
FIG. 4 is a sectional elevation view of the nut runner tool in accordance with the preferred embodiment of the present invention.

Referring to FIG. 4, the air motor 10 is supported on a mounting flange 22 connected to a spinner housing 24. A pinion gear 26 is keyed directly to the end of the air motor drive shaft. The teeth of pinion gear 26 intermesh with the teeth of a spur gear 28, to which a spinner ring 30 is attached. The gears are 12 pitch, 14½° pressure angle with ¾-inch-wide faces. The spur gear 28 is axially supported by a sealed roller bearing 32 captured in a recess of the spinner housing 24 by an outer retaining ring 34. The spinner housing and roller bearing have an internal diameter of sufficient size to allow the RPV closure stud to pass through.

The air motor 10 is connected to the pendent throttle handle by means of a pair of adaptors 70 (only one of which is seen in FIG. 4) which couple to two 5-foot-long ⅛-inch-ID air hoses 36a and 36b (depicted schematically in FIG. 3). Adaptor 68 in FIG. 4 receives an end flow muffler (not shown). The spinner ring 30 is rotated about the tool centerline axis via gears 26 and 28 by operation of air motor 10. Depending on the setting selected on the pendent throttle handle by the operator, the air motor is driven to cause the spinner ring to rotate either clockwise or counterclockwise. The spinner ring 30 has a plurality of castle lugs 38 which engage corresponding key slots on the top of the RPV head closure nut. The castle lugs are screwed into the spinner ring 30 with a guard 31 therebetween. After setting the tool on the nut, the tool turns the closure nut to remove the nut. The spinner housing 24 and air motor assembly are raised by the nut as it travels up the stud.

Figure 5:
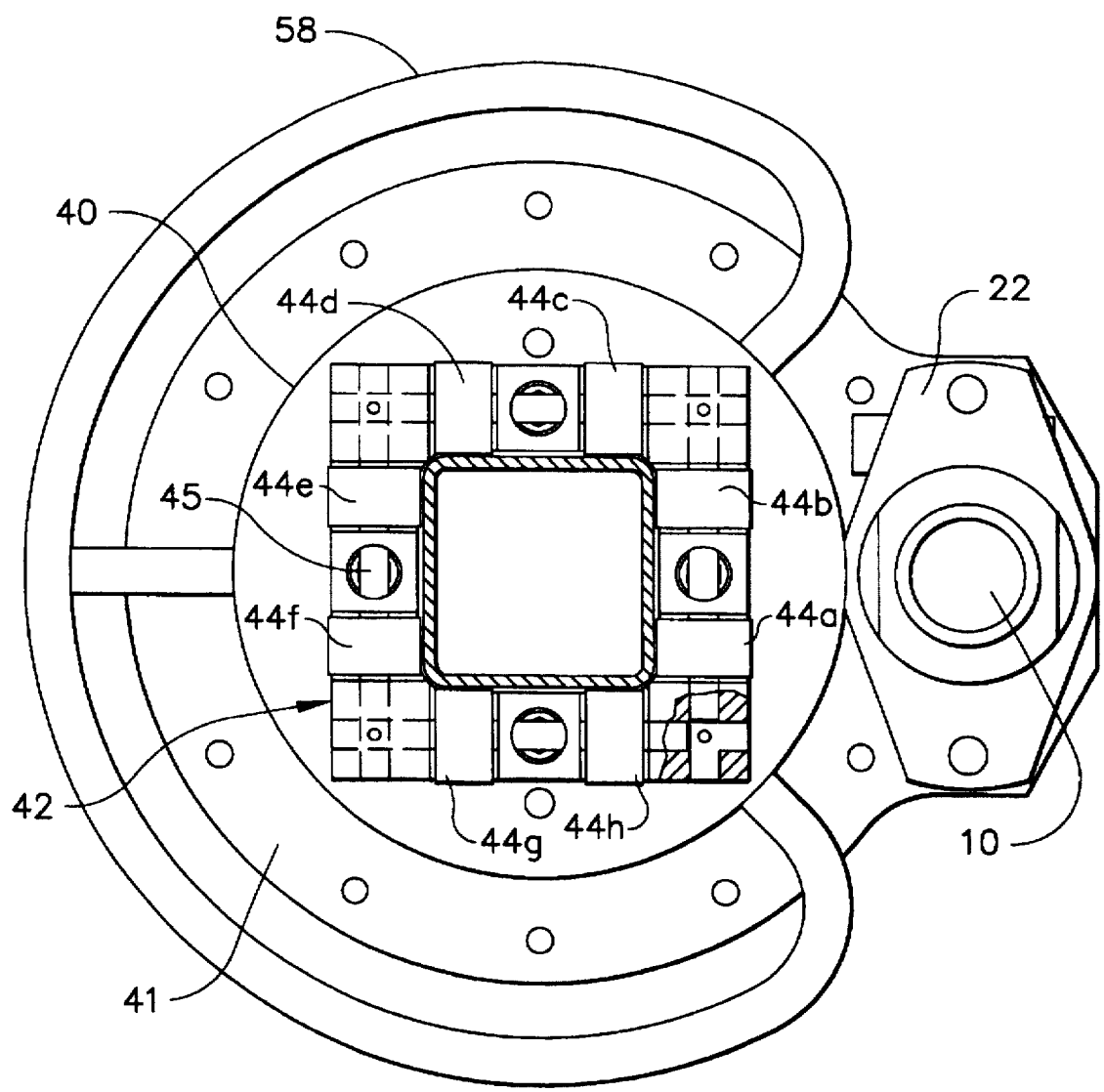
FIG. 5 is a sectional plan view of the nut runner tool taken along section line 5—5 indicated in FIG. 4.
Figure 6A:
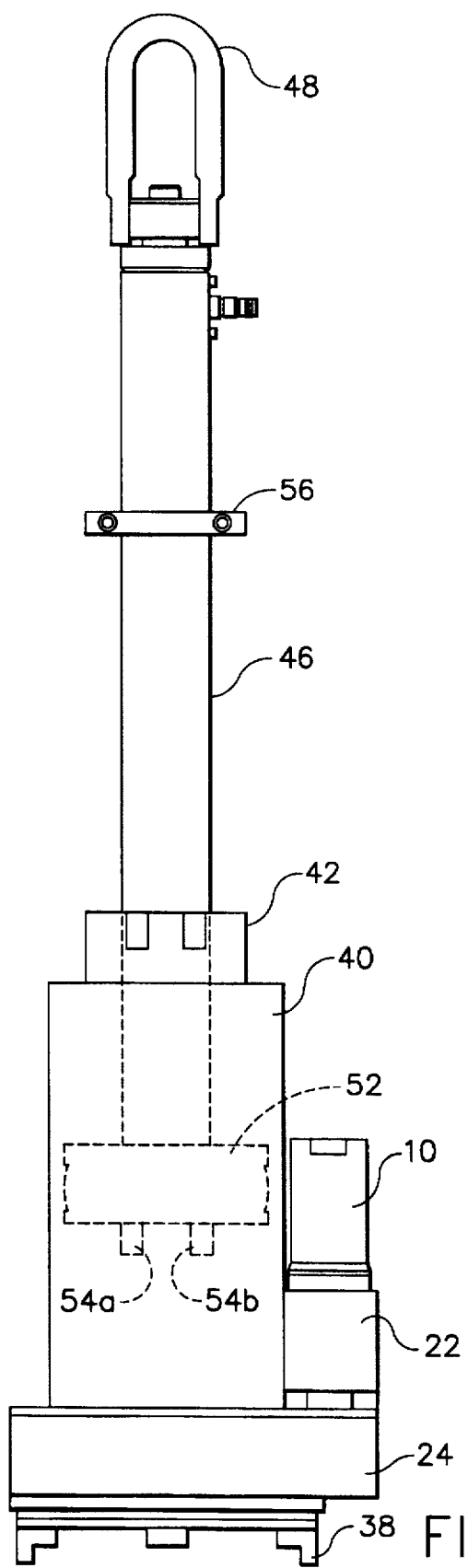
FIGS. 6A and 6B are elevation views showing the nut runner in an extended position (FIG. 6A) and in a retracted position with the closure nut captured (FIG. 6B).

To prevent turning of the nut runner tool as torque is applied to the closure nut, the reaction torque is applied through the spinner housing 24 to the top of the RPV closure stud 2. This allows the operator to use a hand-held pendent to control the operation of the tool. This is accomplished by attaching spinner housing 24 to the flange 41 of a torque transfer tube 40 with lock-wired capscrews. A roller block 42 containing eight cam rollers 44a–44h is bolted on the top of the torque transfer tube. The cam rollers are arranged in a square geometry, as best seen in FIG. 5. Each pair of cam rollers 44a–44h is mounted on a respective horizontal bearing shaft 45. Coaxial rollers 44a and 44b have an axis of rotation parallel to the axis of rotation of coaxial rollers 44e and 44f; coaxial rollers 44c and 44d have an axis of rotation parallel to the axis of rotation of coaxial rollers 44g and 44h. The axes of rotation of rollers 44a and 44b are perpendicular to the axes of rotation of rollers 44c and 44d. Each pair of coaxial cam rollers rolls along a respective surface of a slide tube 46, which has a square cross section (with rounded corners) that passes through the center of the roller block. The upper end of slide tube 46 is connected to the swivel hoist ring 48 (see FIG. 4). The slide tube, which is suspended from the hoist, remains stationary during removal and installation of the nut. As the nut travels up the stud during detorquing, the assembly comprising spinner ring 30, torque transfer tube 40 and roller block 42 travels vertically up slide tube 46—from the relative position shown in FIG. 6A to the relative position shown in FIG. 6B—until the threads of the closure nut are clear of the threads of the stud. A position clamp 56 can be adjustably attached to the slide tube for limiting the travel of the torque transfer tube relative thereto. A circumferential grab bar 58 welded to the torque transfer tube facilitates handling and positioning of the tool.

The lower end of slide tube 46 has a flange 50 to which an air clamp housing 52 is attached by screws. The air clamp housing 52 comprises a pair of clamp retainer rings 52a and 52b which retain the air clamp 12. Air clamp 12 is a double-acting inflatable air clamp made, e.g., of SBR rubber having the general shape of a hollow torus. The interior of air clamp 12 is in flow communication with the actuating valve 18 via various fittings connected by hose segments, only some of which are shown in FIG. 4, including reducing union 62, hose 36c arranged inside slide tube 46, female elbow 64, and bulkhead body 66 supported by a cover 72 which is bolted over an opening in the slide tube wall.

Figure 1A:
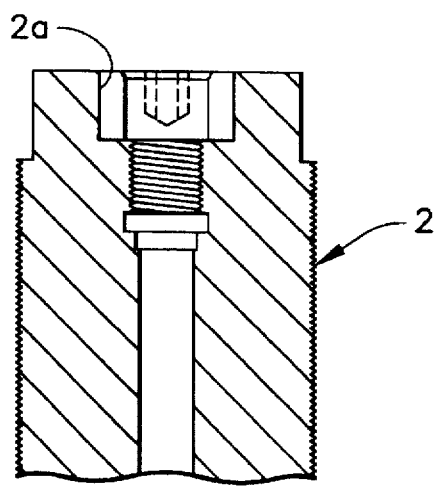
FIG. 1A is a sectional elevation view of a typical RPV head closure stud.
Figure 1B:
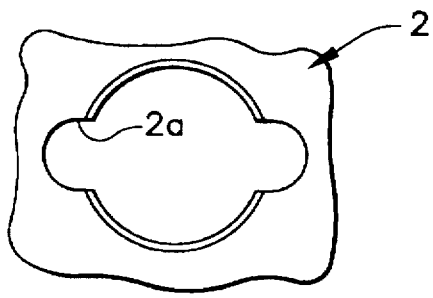
FIG. 1B is a detailed plan view of the portion of the stud designated A in FIG. 1A.

In accordance with a further feature of the present invention, two dowel pins 54a and 54b, pressed into the air clamp housing, engage the slot 2a in the top of the RPV stud (see FIG. 1B). The square roller block 42 mounted on the top of torque transfer tube 40 transmits the motor torque to the dowel pins engaged in the RPV stud.

Figure 6B:
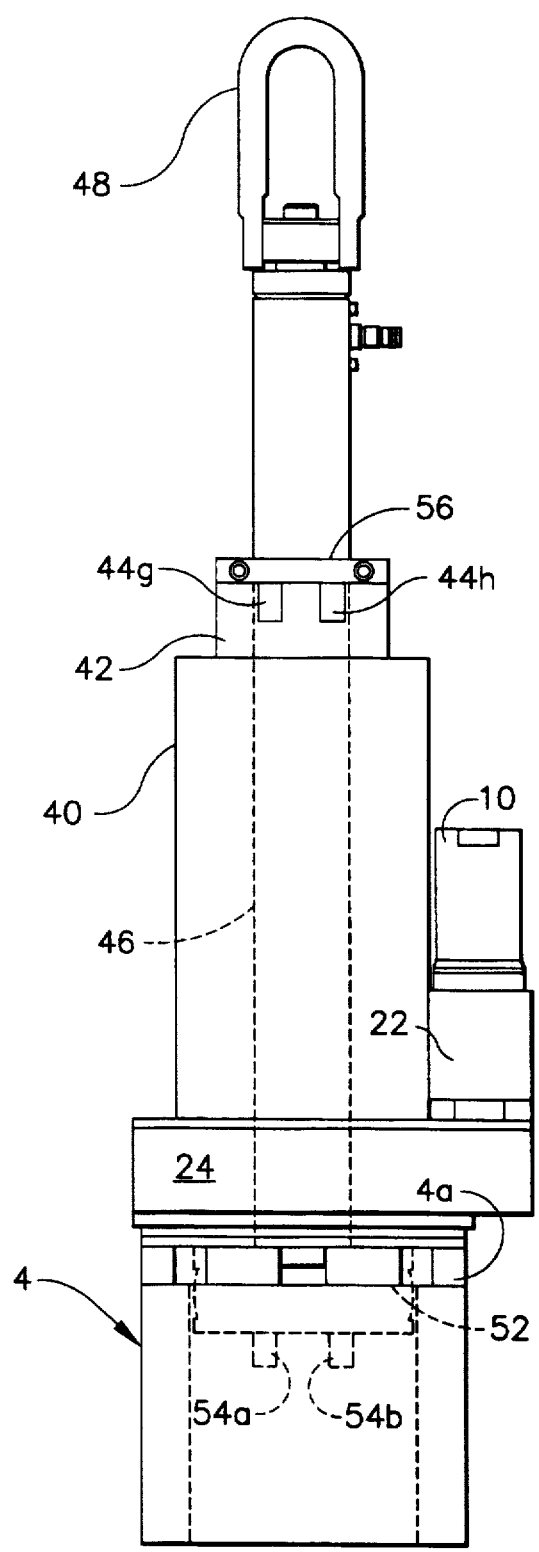

When the closure nut is unthreaded from the closure stud, the air clamp assembly becomes located inside the closure nut, as seen in FIG. 6B. The actuating valve 18 (see FIG. 3) on the pendent throttle handle 14 is opened to supply air to the air clamp 12. The air clamp then expands into the internal diameter of the nut and firmly captures it for lifting and removal. To prevent dropping the nut during lifting and transport, check valve 20 (see FIG. 3) is provided upstream of the actuating valve 18 to maintain pressure on the air clamp 12 in the event of loss of air.

When the closure nut is unthreaded from the closure stud and the air clamp 14 engaged to the nut, the operator raises the nut runner 8 using the air chain hoist 6 until the nut 4 clears the top of the stud 2. The operator then pulls on the grab bar 58 to drift the tool over the nut storage tray (not shown) and lowers the nut into its storage slot. When the nut is seated in the storage tray, the actuating valve 18 to the air clamp is positioned to vent the seal, which releases the nut. The nut runner is then moved along the carousel track to the next location.

Arrows on the pendent throttle handle indicate the direction of travel for nut removal and installation. Pressing the DOWN arrow lever will turn the spinner ring clockwise, installing the nut. Pressing the UP arrow lever will turn the spinner ring counterclockwise, removing the nut.

To remove a nut from its associated stud, the operator must verify that the air clamp is disengaged. The nut runner tool is raised to clear the top of the stud. Then the nut runner is lowered over the closure stud until the hoist ring indicates a slack load. The operator manually rotates the square slide tube until the reaction torque dowel pins engage the slot on top of the stud. Arrows are marked on the side of the spinner housing indicating the centerline of the dowel pins to aid orientation. Then the control pendent is throttled to slowly jog the spinner ring until the castle lugs engage the key slots 4a on the nut 4 (see FIGS. 2A and 2B). The tool is then operated in the UP direction until the nut is unthreaded from the stud. The air motor is throttled to decrease speed as the nut nears the top of the stud. The motor is stopped when the nut is unthreaded. At this juncture, the operator must verify that the position clamp on the slide tube is in contact with the top of the roller block. The position of the clamp should be adjusted as necessary to achieve contact. This will ensure that the air clamp is in the proper position for reinstallation of the nut.

After adjustment of the position clamp, the actuating valve is operated so as to inflate the air clamp to engage the internal diameter of the nut. Then the control pendent is stowed by hooking it to the grab bar. The hoist is then operated to raise the nut until it is clear of the top of the stud. The operator manually pulls on the grab bar to drift the nut runner over the storage tray. When the nut is seated in the storage tray, the actuating valve is operated so as to disengage the air clamp and release the nut from the nut runner. Then the hoist is operated to raise the nut runner and position it over the next nut to be removed.

To install a nut, the operator manually pulls on the grab bar to drift the nut runner over the closure nut storage tray. The operator must verify that the air clamp is disengaged. Then the air hoist is operated to lower the nut runner onto the nut in the storage tray. The castle lugs must be aligned to engage the keyways 4a on the closure nut 4 (see FIGS. 2A and 2B). Lowering of the nut runner is continued until the position clamp contacts the top of the roller block. The position clamp must be in contact with the roller block in order to locate the air clamp at the proper position for nut installation. The actuating valve is operated so as to inflate the air clamp to engage the internal diameter of the nut. While holding onto the grab ring, the operator operates the hoist and raises the nut to clear the top of the stud. Then the nut is carefully lowered over the stud until the hoist ring indicates a slack load. The operator manually rotates the square slide tube until the reaction torque dowel pins engage the slot on top of the stud. Then the actuating valve is operated so as to disengage the air clamp and release the nut from the nut runner. The air motor is throttled in the DOWN direction to slowly start the nut onto the stud. Alternatively, the nut can be started on the stud thread by hand turning. When the nut has started, the air motor is run in the DOWN direction at full speed. The operator should throttle back on the air motor as the nut approaches the RPV head flange.

The preferred embodiment of the present invention have been disclosed for the purpose of illustration. Variations and modifications of the disclosed structure which fall within the concept of this invention will be readily apparent to persons skilled in tooling design. All such variations and modifications are intended to be encompassed by the claims set forth hereinafter.

I claim:

1. A nut runner comprising:

a motor driven by pressurized fluid;

a housing assembly for supporting said motor;

a ring rotatably mounted in said housing;

a plurality of axial projections attached to and circumferentially distributed on said ring;

a slide tube having a lower end and a longitudinal axis;

an inflatable clamp mounted on said lower end of said slide tube and inside said housing assembly, said clamp being inflatable in response to receipt of pressurized fluid; and a roller block attached to said housing assembly and comprising a plurality of rollers which roll on the outside of said slide tube in parallel with said longitudinal axis, whereby said housing assembly can displace longitudinally relative to said slide tube.

2. The nut runner as defined in claim 1, wherein said pressurized fluid is air.

3. The nut runner as defined in claim 1, further comprising a pinion gear mounted on an end of a drive shaft of said motor and a spur gear having teeth which intermesh with teeth of said pinion gear, wherein said ring is attached to said spur gear.

4. The nut runner as defined in claim 1, further comprising a swivel hoist ring connected to an upper end of said slide tube.

5. The nut runner as defined in claim 1, further comprising a clamp housing for retaining said inflatable clamp, and a pair of axially oriented dowel pins mounted to said clamp housing.

6. The nut runner as defined in claim 1, further comprising a clamp housing for retaining said inflatable clamp, and axial projection means mounted to said clamp housing.

7. The nut runner as defined in claim 1, wherein said slide tube has a plurality of planar surfaces running parallel to said longitudinal axis.

8. The nut runner as defined in claim 7, wherein said slide tube has first through fourth planar surfaces, said first and third planar surfaces being mutually parallel, said second and fourth planar surfaces being mutually parallel and perpendicular to said first and third planar surfaces, and said plurality of rollers comprises first through eighth rollers, said first and second rollers rolling along said first planar surface, said third and fourth rollers rolling along said second planar surface, said fifth and sixth rollers rolling along said third planar surface, and said seventh and eighth rollers rolling along said fourth planar surface.

9. The nut runner as defined in claim 1, wherein said axial projections comprise castle lugs.

10. The nut runner as defined in claim 1, further comprising a position clamp which can be clamped to the outside of said slide tube at any axial position within a range of axial positions to limit axial travel of said roller block.

11. A nut runner for removing and installing closure nuts having a plurality of key slots from and on closure studs of a reactor pressure vessel head, each stud having a recess in its upper endface of predetermined shape, comprising:

first engagement means for engaging the key slots of the closure nuts;

means transferring a torque to the nut via said first engagement means;

first support means for supporting said first engagement means and said torque transferring means;

second engagement means for engaging the recess in the stud endface, said second engagement means fitting in the recess in a manner so that said second engagement means cannot rotate about an axis of the stud;

second support means for supporting said second engagement means; and means for coupling said first support means to said second support means so that first support means is free to displace relative to said second support means along the stud axis, but cannot rotate relative to said second support means about the stud axis.

12. The nut runner as defined in claim 11, wherein said torque transferring means comprises an air-powered motor.

13. The nut runner as defined in claim 11, further comprising means for capturing the nut by engagement with the internal diameter of the nut.

14. The nut runner as defined in claim 13, wherein said nut capturing means comprises an air clamp.

15. The nut runner as defined in claim 11, wherein said coupling means comprises a roller block having a central hole which form fits around a tubular portion of said second support means, and a plurality of rollers pivotably mounted in said roller block with horizontal axes of rotation, said rollers being rollable on the outer surface of said tubular portion in a vertical direction.

16. A nut runner for removing and installing closure nuts having a plurality of key slots from and on closure studs of a reactor pressure vessel head, comprising:

first engagement means for engaging the key slots of the closure nuts;

means transferring a torque to the nut via said first engagement means;

first support means for supporting said first engagement means and said torque transferring means;

second support means having a tubular outer surface;

means for coupling said first support means to said second support means so that first support means is free to displace relative to said second support means along the stud axis; and means for capturing the nut by engagement with the internal diameter of the nut.

17. The nut runner as defined in claim 16, wherein said nut capturing means comprises an inflatable clamp.

18. The nut runner as defined in claim 16, further comprising second engagement means for engaging a recess in an endface of the stud, said second engagement means fitting in the recess in a manner so that said second engagement means cannot rotate about an axis of the stud, wherein said second support means supports said second engagement means, and said coupling means couples said first support means to said second support means so that first support means cannot rotate relative to said second support means about the stud axis.

19. The nut runner as defined in claim 18, wherein said coupling means comprises a roller block having a central hole which form fits around said tubular portion of said second support means, and a plurality of rollers pivotably mounted in said roller block with horizontal axes of rotation, said rollers being rollable on the outer surface of said tubular portion in a vertical direction.

* * * * *